United States Patent [19]
McCabe

[11] 3,809,134
[45] May 7, 1974

[54] DEVICE FOR DELIMBING TREES
[76] Inventor: Thomas C. McCabe, Duluth, Minn.
[22] Filed: July 27, 1973
[21] Appl. No.: 383,267

Related U.S. Application Data
[63] Continuation of Ser. No. 213,466, Dec. 29, 1971, abandoned.

[52] U.S. Cl. .............................. 144/2 Z, 144/3 D
[51] Int. Cl. .............................................. B27c 9/00
[58] Field of Search ............................ 144/2 Z, 3 D

[56] References Cited
UNITED STATES PATENTS

| | | | |
|---|---|---|---|
| 3,620,272 | 11/1971 | Eriksson et al. | 144/2 Z |
| 3,572,410 | 3/1971 | McElderry | 144/2 Z |
| 3,461,928 | 8/1969 | Siiro | 144/3 D |
| 3,183,949 | 5/1965 | Larson | 144/2 Z |

Primary Examiner—Andrew R. Juhasz
Assistant Examiner—W. D. Bray
Attorney, Agent, or Firm—Wicks & Nemer

[57] ABSTRACT

A delimber head for removing the limbs from felled trees by drawing the trees through the head in which primary left and right axially facing cutting units are pivoted to a base and urged toward one another by hydraulic force producing means and secondary left and right axially facing cutting units are pivoted to the first named cutting units and moved into cutting position by restraining means acting between and said base and said secondary cutting units.

9 Claims, 5 Drawing Figures

INVENTOR.
THOMAS C. McCABE
BY
Wiles & Nemer
ATTORNEYS

DEVICE FOR DELIMBING TREES

CROSS REFERENCE

This is a continuation of application Ser. No. 213,466 filed Dec. 29, 1971, now abandoned.

SUMMARY OF THE INVENTION

The invention relates to an improvement in devices for delimbing felled trees and more particularly to a delimber head which in open position receives a tree and which has primary and secondary arcuate cutting blade units which are moved to encompass the tree, the primary blade units actuating the secondary blade units.

In the drawings illustrating an embodiment of the invention:

Figure 1:
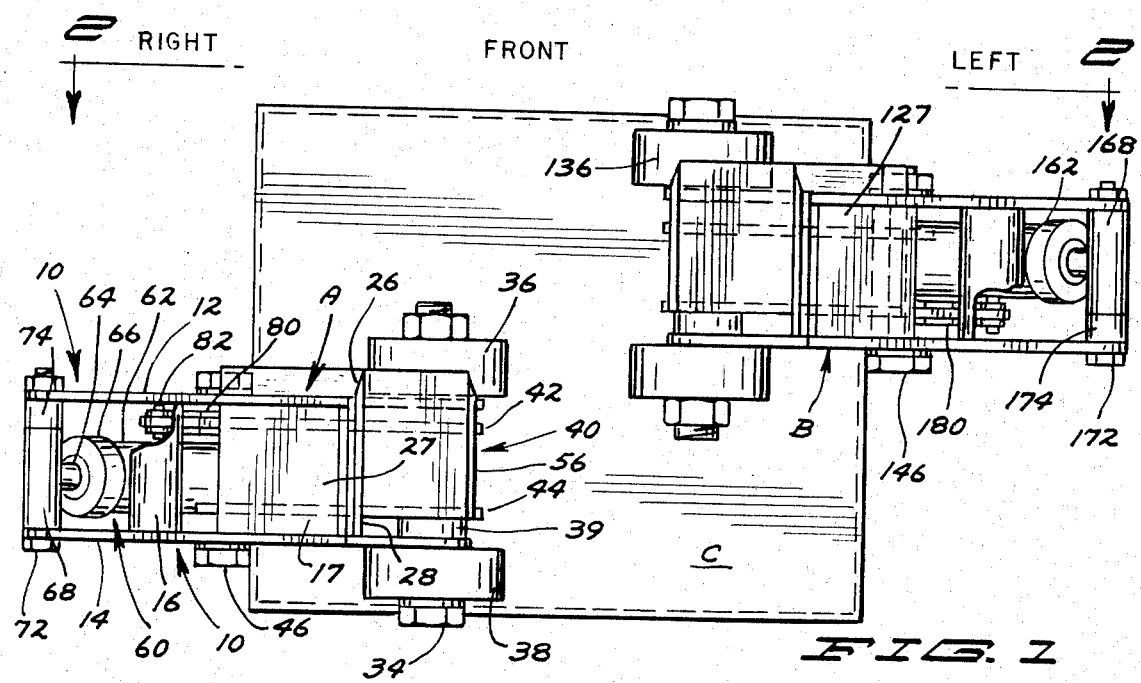
FIG. 1 is a plan view of the delimber.

The invention utilizes two cutting units A and B which are identical in construction except that the unit A is righthanded and the unit B is lefthanded. Due to the similarity of parts only the unit A will be described and the same reference numerals preceded by the digit 1 used to designate the corresponding parts in unit B.

The units A and B are mounted on a base C constructed of steel plates welded or otherwise fabricated and mounted on standards 6 and 8.

The unit A comprises primary swinging means 10 consisting of two spaced plates 12 and 14 of identical construction, separated by a tubular spreader 16 and a plate spreader 17, welded or otherwise secured to one of said plates. The forward portions 18 of these plates are formed with an arcuate socket 22 in which is received an arcuate cutter 24 having a sharpened edge 26. This cutter is welded at its end 28 opposite edge 26 to the plate 14 and at the cutter end to the plate 12. The lower ends 32 of the plates 12 and 14 are drilled to receive a bolt 34 which pass through bearings 36 and 38 welded to the base C. A sleeve 39 encircles the bolt 34 and serves as a spreader for holding parts in assembled relation. A bracing plate 27 extends between the upper portion 13 of a plate 14 and plate 12 and is welded to plate 12.

The cutting unit A also includes secondary swinging means 40 which includes two facing plates 42 and 44 and which lie between the plates 12 and 14 and which are all drilled to receive a bolt 46. The plates 42 and 44 have arcuate surfaces 52 and 54 and an arcuate cutter 56 disposed adjacent these surfaces is welded to the plate 52. The cutter 56 is formed with a sharpened edge 58.

Figure 2:
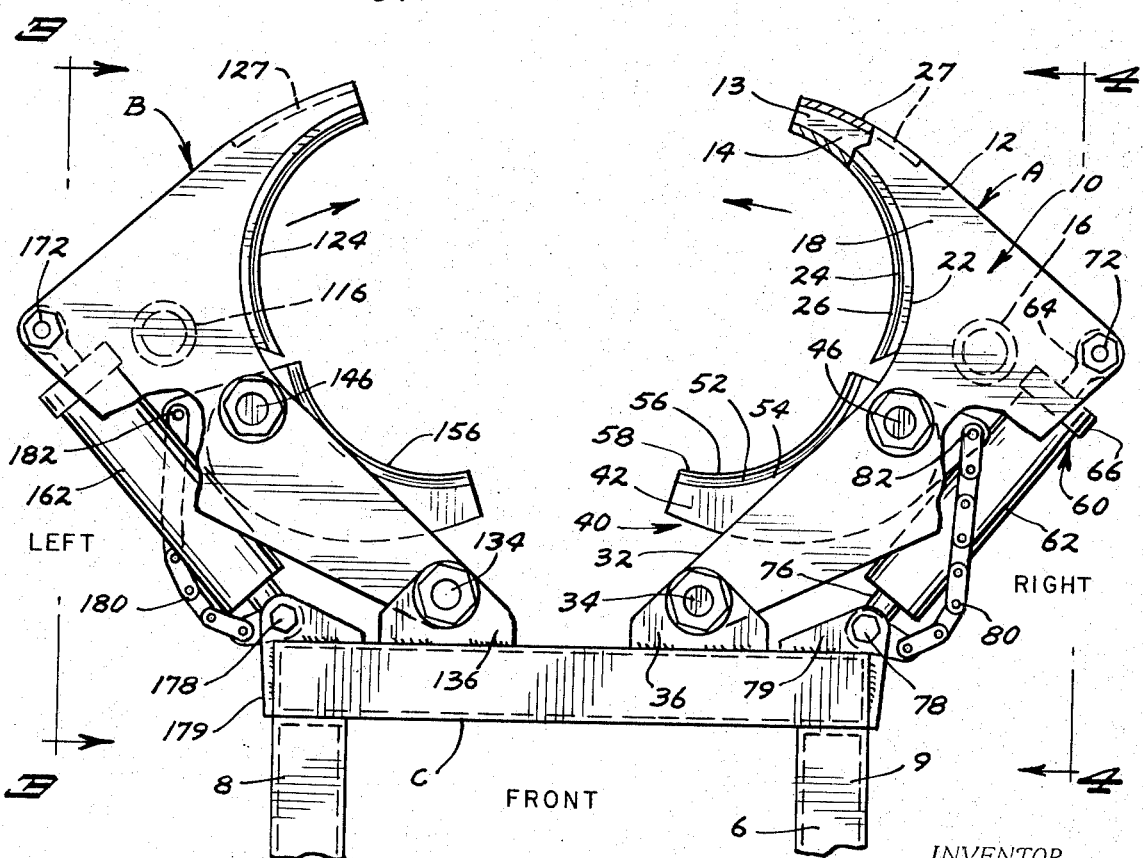
FIG. 2 is a front elevational view of the delimber, showing the cutting units spaced to a maximum distance to receive the butt of the maximum size tree.
Figure 3:
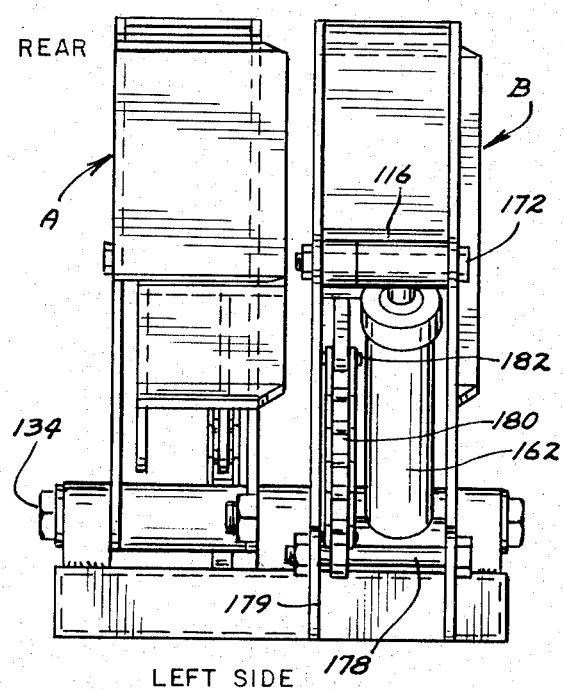
FIG. 3 is an elevational view of the left side of the delimber shown in FIG. 2.
Figure 4:
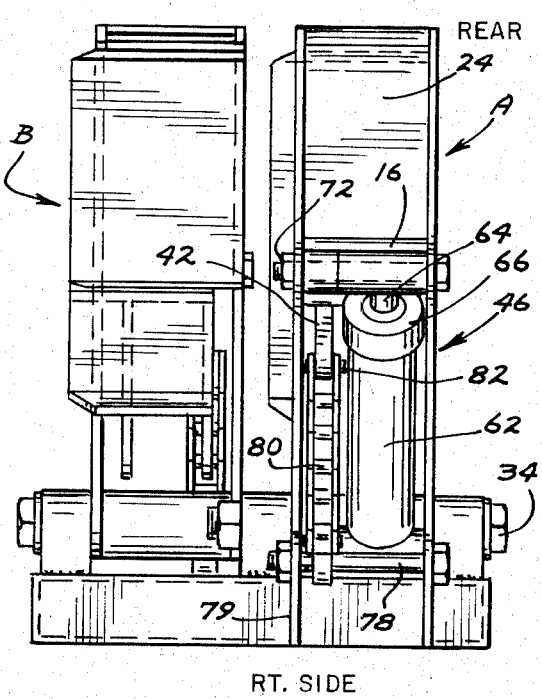
FIG. 4 is an elevational view of the delimber taken from the right side of the delimber.
Figure 5:
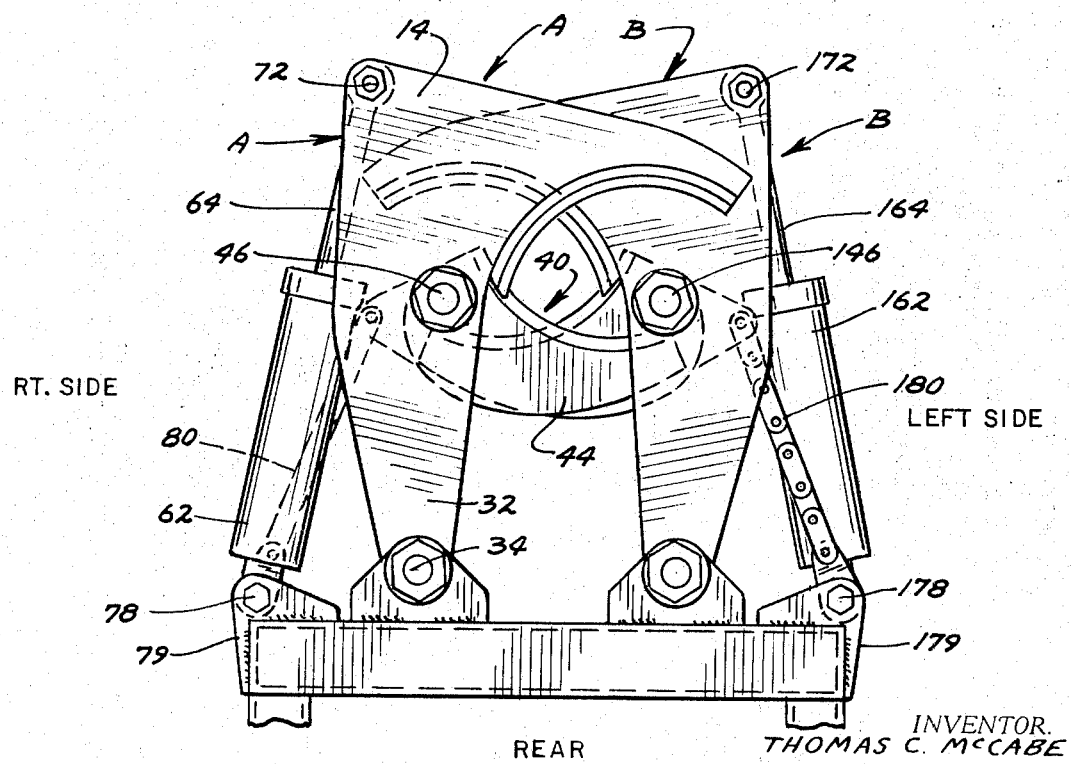
FIG. 5 is a front elevational view similar to FIG. 2 and showing the cutting units disposed to delimb the smaller end of the minimum size trees.

The swinging means 10 is swung about the axis of bolt 34 from its maximum open position as shown in FIG. 2 to its position shown in FIG. 5 by means of hydraulic force producing means 60. This force producing means includes a cylinder 62 having a piston therein, not shown, and connected to a piston rod 64 slidably mounted in a cap 66 attached to the open end of the cylinder. The piston rod 64 has a tubular cross-head 68. A bolt 72 extends through the arms 12 and 14 through the cross-head 68 and through a collar 74. The lower end of the cylinder 62 has an extension 76 and a bolt 78 passes through this extension and a bracket 79 secured to the base C, thus pivoting the cylinder for swinging movement relative to said base C.

Attached to the bracket 79 by means of the bolt 78 is one end of a restraining member in the form of the short chain 80. The other end of this chain is attached by a bolt 82 to the plates 42 and 44 of the secondary swinging means.

The device operates and is used as follows: a felled tree is placed between the units A and B in the open position. Fluid pressure is then introduced from a source not shown into the cylinders 80 and 180 which moves the primary swinging means. As the primary swinging means is actuated the secondary swinging means is actuated through takeup of the chains 80 and 180 which brings radii of the primary and secondary cutters of both the cutting units towards coincidence at the axis of the tree as the tree is drawn through the delimber head. As the tree is drawn through the unit the branches are cut by the blades.

I claim:

1. A delimber head for removing the limbs from felled trees by drawing the trees therethrough, said head comprising:

a. a base along which the trees are drawn,
    b. right and left axially facing cutting units pivotally mounted on said base for movement toward or from the axis of the tree said units each comprising
    c. a pair of single opposed primary plates having an upper, a lower and a mid-portion
    d. primary pivot means mounted on said base said primary plates pivotally mounted at the lower portion thereof to said primary pivot means,
    e. a primary arcuate cutter mounted on said primary plates
    f. extendable hydraulic force producing means, one end thereof pivotally mounted to said base the other end thereof in direct contact with said pair of primary plates,
    g. a pair of single opposed secondary plates having an upper, a lower and a mid-portion,
    h. secondary pivoting means mounted on said primary plates at the mid-portion thereof, said secondary pivoting means pivotally mounting said secondary plates at the upper portion thereof to said primary plates at the mid-portion of said primary plates
    i. a secondary arcuate cutter mounted on said secondary plates and substantially similar to said primary arcuate cutters mounted on said primary plates,
    j. single flexible restraining means extending from said base to said secondary plates at the upper portion thereof above said secondary pivoting means such that when said pivotally mounted hydraulic means is extended, said pivotally mounted primary plates arc downwardly toward the base and transport the secondary plates therewith whereby said restraining means restrains the upper portion of said pivotally mounted secondary plates such that the lower portion of secondary plates arc upwardly toward the lower portion of the tree on the base.

2. A delimber head for removing the limbs from felled trees according to claim 1 wherein
   a. said primary pivoting means is closer to one end of the cutting edge of the primary cutter than the other.
3. A delimber head for removing the limbs from felled trees according to claim 1 wherein
   a. said secondary pivoting means is closer to one end of the cutting edge of the secondary cutter than the other.
4. A delimber head for removing the limbs from felled trees according to claim 1 wherein
   a. the restraining means is in the form of a chain.
5. A delimber head for removing the limbs from felled trees according to claim 1 wherein
   a. said restraining means is pivotally mounted at one end thereof to said base and is pivotally mounted at the other end thereof to said secondary plates.
6. A delimber head for removing the limbs from felled trees according to claim 1 wherein
   a. said primary plates are disposed in a spaced parallel relationship and
   b. said secondary plates are disposed in a spaced parallel relationship.
7. A delimber head for removing the limbs from felled trees according to claim 6 wherein
   a. said spaced secondary plates are disposed between said spaced primary plates.
8. A delimber head for removing the limbs from felled trees according to claim 7 wherein
   a. said hydraulic force producing means extends between said spaced secondary plates.
9. A delimber head for removing the limbs from felled trees according to claim 8 wherein
   a. said hydraulic force producing means contacts said primary plates at the upper portion thereof.

* * * * *